United States Patent [19]

Yu

[11] Patent Number: 5,497,825

[45] Date of Patent: Mar. 12, 1996

[54] HEAT-RADIATOR FOR CPU OF A COMPUTER

[75] Inventor: Chien-Chun Yu, Taipei, Taiwan

[73] Assignee: Symphony Group International Co., Ltd., Taipei, Taiwan

[21] Appl. No.: 449,397

[22] Filed: May 24, 1995

[51] Int. Cl.⁶ .................................. F28F 7/00; H05K 7/20
[52] U.S. Cl. .................. 165/11.1; 165/40; 165/80.3; 165/121; 361/695; 257/721
[58] Field of Search .................... 165/11.1, 40, 80.3, 165/121; 361/695, 697; 257/713, 721, 722

[56] References Cited

U.S. PATENT DOCUMENTS

| | | | |
|---|---|---|---|
| 5,102,040 | 4/1992 | Harvey | 236/49.3 |
| 5,107,398 | 4/1992 | Bailey | 361/695 X |
| 5,422,787 | 6/1995 | Gourdine | 361/697 |

FOREIGN PATENT DOCUMENTS 5-315780  11/1993  Japan ........................ 361/695

Primary Examiner—Allen J. Flanigan
Attorney, Agent, or Firm—Vardell Legal Group

[57] ABSTRACT

A heat-radiator for CPU of a computer, mainly including an air exhaust box, a collection funnel means and a bellows connecting the air exhaust box with the collection funnel means. An air blower and a detector means are disposed in the air exhaust box and connected by a circuit interface board inserted in an interface socket of the computer. The collection funnel means includes a heat-radiating plate located on the CPU, whereby the heat generated by the CPU is conducted through the heat-radiating plate and radiated therefrom to the ambient air and the hot air in the collection funnel means is sucked by the air blower to flow through the bellows and the air exhaust box to be exhausted from the computer housing.

12 Claims, 6 Drawing Sheets

HEAT-RADIATOR FOR CPU OF A COMPUTER

BACKGROUND OF THE INVENTION

The present invention relates to a heat-radiator for CPU of a computer, and more particularly to a heat-radiator which employs a collection funnel and an air blower to radiate heat generated by the CPU outside the computer housing.

A CPU of a current computer works as an analytic center and a main heat generating source thereof. The faster the CPU operates, the higher the temperature created thereby is. The high temperature will not only affect the operation speed and life of the CPU, but also affect the functions of other parts of the computer. Therefore, a heat-radiator is necessary for lowering the temperature of the CPU.

A conventional heat-radiator for the CPU includes a radiator plate disposed on the CPU and a rotary fan installed on the radiator plate, whereby the air in the interior of the computer housing is blown and circulated to dissipate the heat. However, the hot air is blown and circulated inside the close computer housing. This creates a heating effect, gradually increasing the temperature in the housing. Therefore, the heat radiation effect provided by such conventional heat-radiator is quite limited and insufficient.

Therefore, an improved heat-radiator for CPU of a computer is needed to eliminate the above shortcoming.

SUMMARY OF THE INVENTION

It is therefore a primary object of the present invention to provide an improved heat-radiator for CPU of a computer, which includes an air exhaust box disposed on the interface socket of the computer main board and a collection funnel means located on the CPU and connected to the air exhaust box by a bellows. An air blower is disposed in the air exhaust box to suck hot air with the heat generated by the CPU outside the computer housing. A detector means is disposed in the air exhaust box and connected to the air blower by a circuit interface board inserted in an interface socket of the computer main board. The collection funnel means includes a collection funnel, a heat-radiating plate located on the CPU and two clamping casings for clamping the CPU under the collection funnel.

The present invention can be best understood through the following description and accompanying drawings, wherein:

DETAILED DESCRIPTION OF THE PREFERRED EMBODIMENTS

Figure 1:
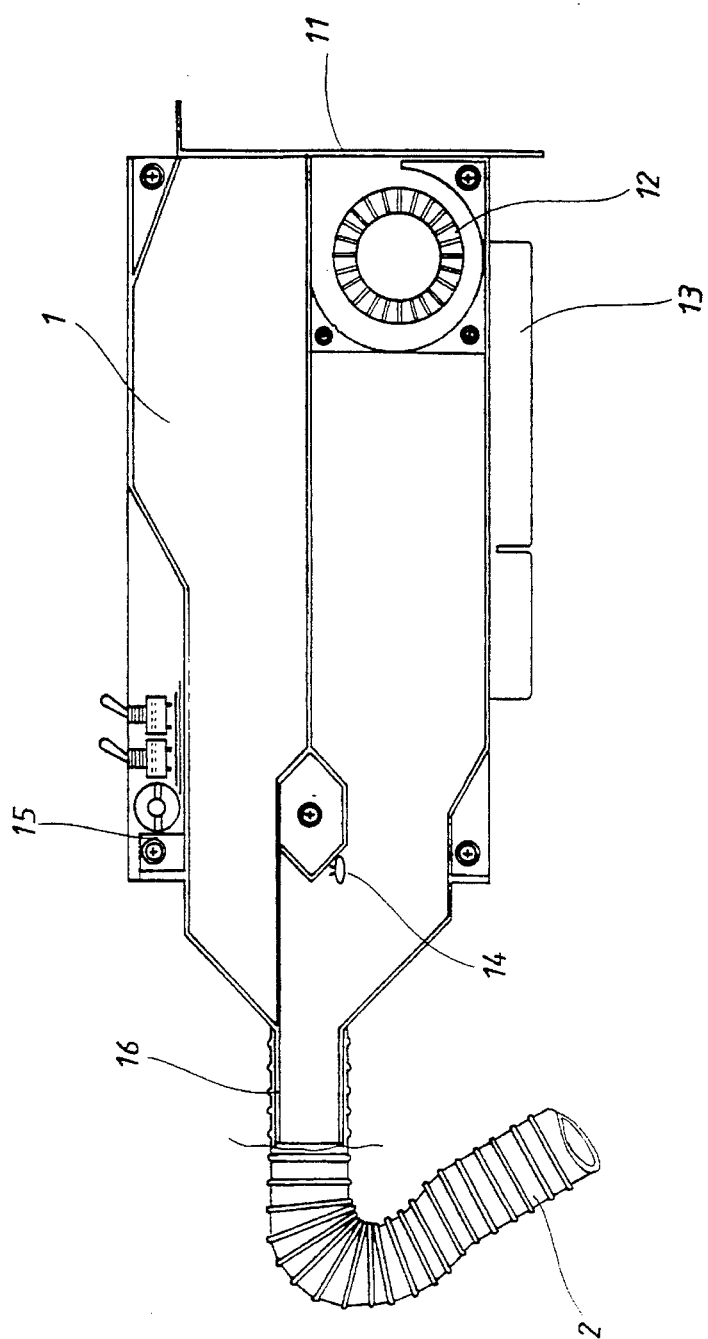
FIG. 1 is a partially sectional plane view of one embodiment of the present invention.
Figure 7:
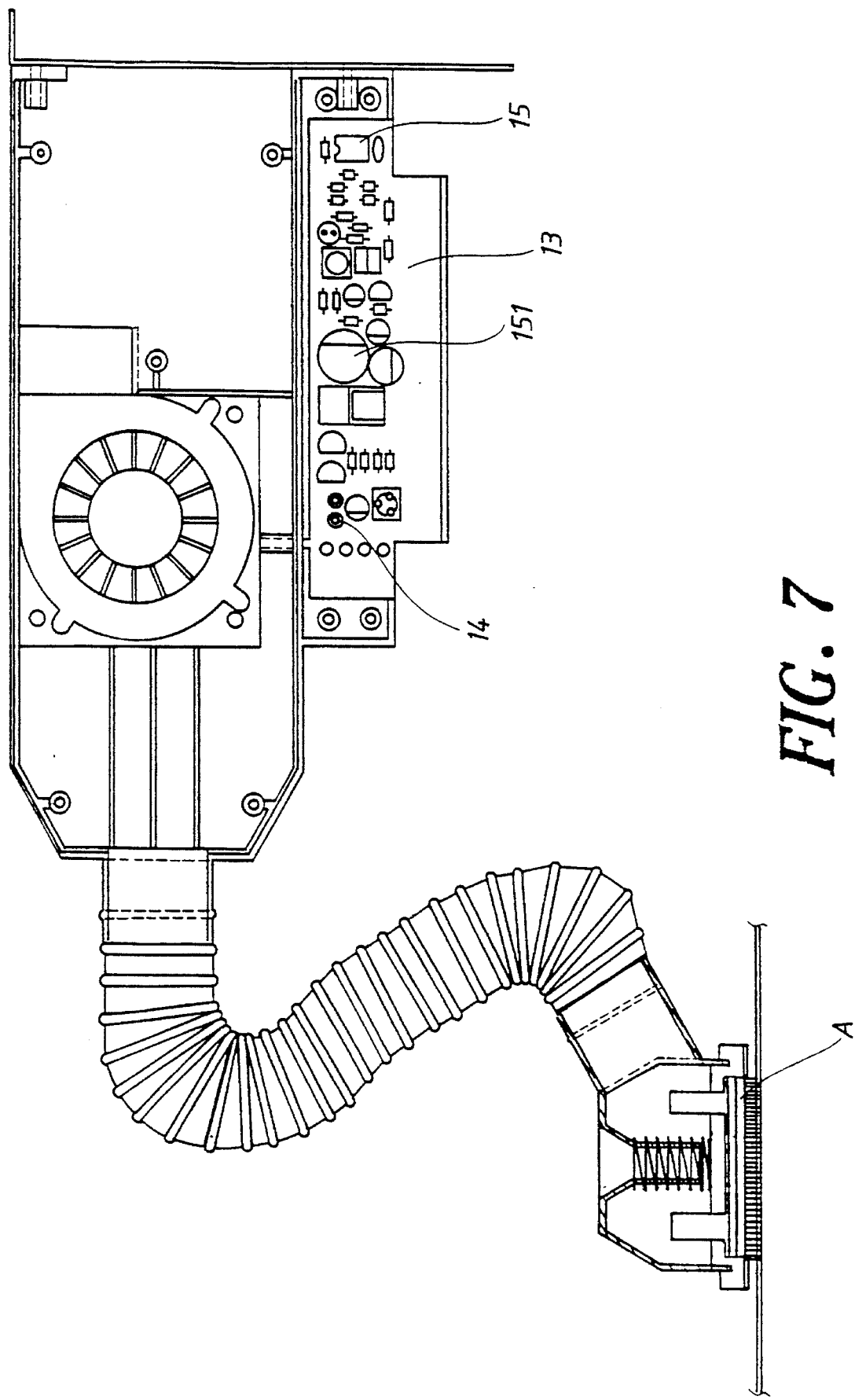
FIG. 7 is a partially sectional plane view of another embodiment of the present invention.

Please refer to FIG. 1. The heat-radiator of the present invention includes an air exhaust box 1, a bellows 2 and a collection funnel means 3. The air exhaust box 1 is formed with an air exit 11 at the front end thereof. An air blower 12 is disposed at the front end of the air exhaust box 1 beside the air exit 11. A circuit interface board 13 is disposed in the air exhaust box 1 to connect with a temperature detector 14 and a circuit detector 15 disposed outside the air exhaust box 1 as shown in FIG. 7. The air exhaust box 1 further has an air incoming pipe 16 for the bellows 2 to fit around. A buzzer 151 can be connected with the circuit detector 15, whereby when the impedance of the circuit increases, the buzzer 151 can emit a warning sound.

Figure 2:
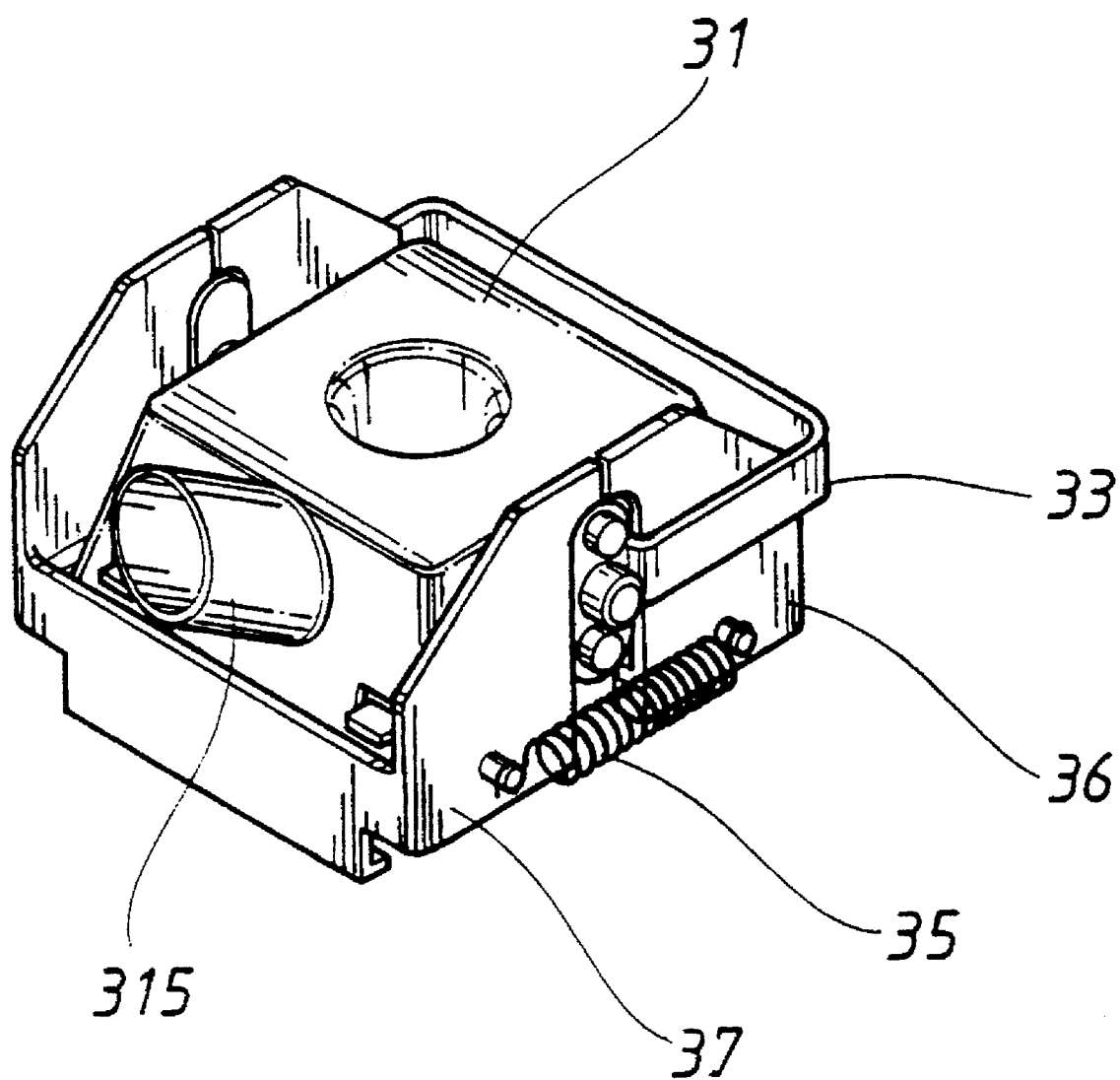
FIG. 2 is a perspective view of a first embodiment of the collection funnel means of the present invention.
Figure 3:
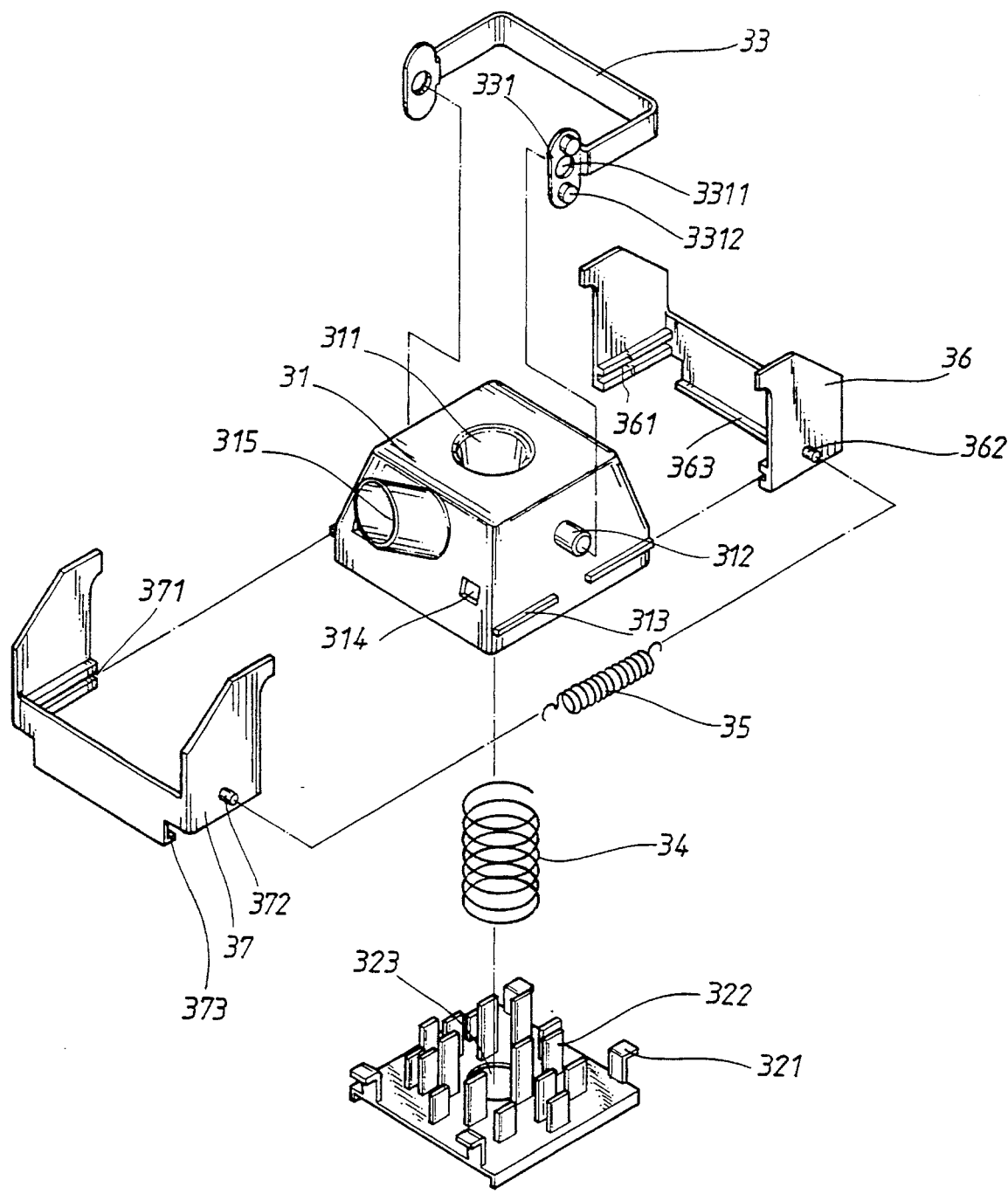
FIG. 3 is a perspective exploded view of the collection funnel means according to FIG. 2.

Please refer to FIGS. 2 and 3. The collection funnel means 3 mainly includes a collection funnel 31, heat-radiating plate 32, pushing member 33, two hooking springs 35, a compression spring 34 and two clamping casings 36, 37. The collection funnel 31 has a hollow circular tube 311 downward extending from a top portion of the collection funnel 31, whereby the spring 34 is fitted around the circular tube 311 to abut against the heat-radiating plate 32. On two lateral sides of the collection funnel 31 are respectively formed two bosses 312 and slide rails 313 located thereunder. On the other two lateral sides of the collection funnel 31 are respectively formed two pairs of latch holes 314. In addition, an air outgoing pipe 315 is disposed on one of the lateral sides for the bellows 2 to fit therewith. The two clamping casings 36, 37 are substantially U-shaped and opposite to each other. On bottom ends of inner sides of the clamping casings 36, 37 are formed slide channels 361, 371 for slidably receiving the slide rails 313 of the collection funnel 31. The clamping casings 36, 37 respectively have two tenons 362, 372 on outer sides, whereby the spring 35 is hooked between the tenons to tightly associate the clamping casings 36, 37 together. The clamping casings 36, 37 further respectively have two opposite hooking sections 363, 373 downward extending from bottom ends thereof for hooking/clamping CPU (A). The pushing member 33 is also U-shaped and has two elliptic pivot plates 331 at two ends respectively. Each pivot plate 331 is formed with a central circular hole 3311 for pivotally fitting with the bosses 312 of the collection funnel 31. Two cylindrical projections 3312 are disposed on each pivot plate 331 respectively above and below the central circular hole 3311. The heat-radiating plate 32 is located on the CPU (A) and disposed with four latch hooks 321 on four corners respectively. The latch hooks 321 are up and down movably received in the latch holes 314 of the collection funnel 31. Multiple elongated column plates 322 are disposed on the heat-radiating plate 32 and a circular hole 323 is formed on a central portion thereof.

Figure 5:
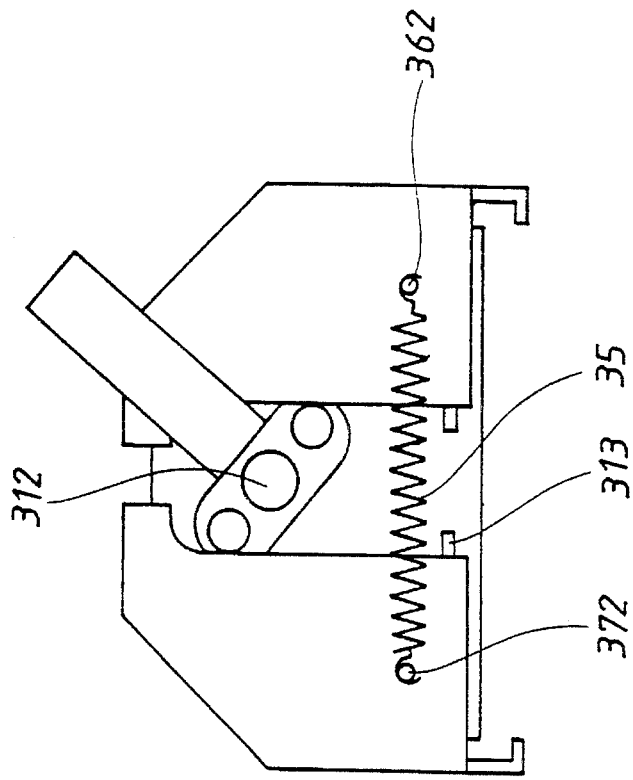
FIG. 5 is a plane view of the collection funnel means of the present invention in a separated state.
Figure 4:
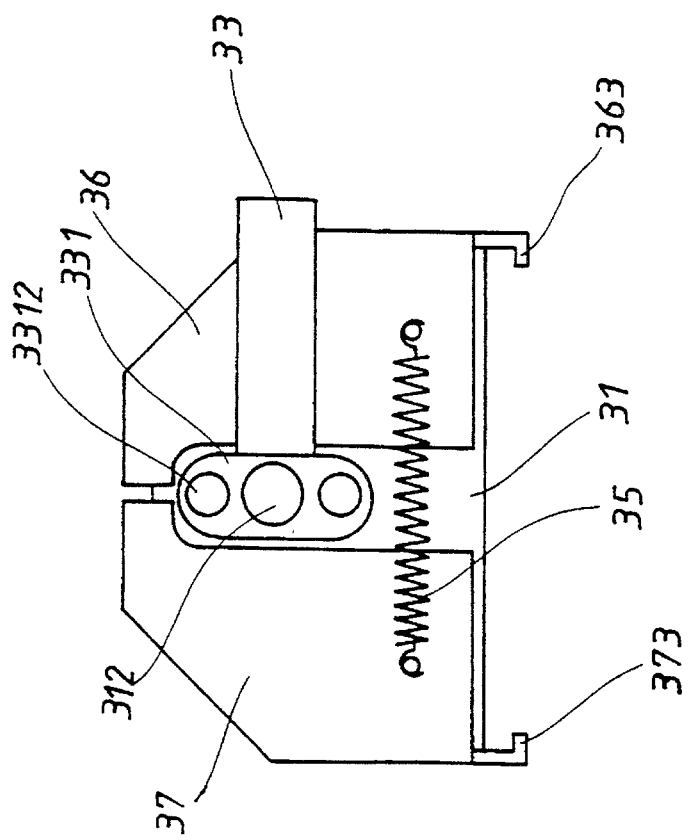
FIG. 4 is a plane view of the collection funnel means of the present invention in an associated state.

Please refer to FIG. 4 which shows the collection funnel means 3 in an associated state. When installed, the pushing member 33 is first pivoted upward. At this time, the cylindrical projections 3312 are moved toward the clamping casings 36, 37 to separate the same as shown in FIG. 5. Thereafter, the collection funnel means 3 is located on the CPU (A) and then the pushing member 33 is restored to its home position. At this time, the CPU (A) is clamped between the hook sections 363, 373. By means of the hook sections 363, 373, the present invention can be applied to different CPUs with various specifications to as well achieve very good heat-radiating effect. Also, the spring 34 presses the heat-radiating plate 32 against the CPU (A) so as to tightly contact therewith and achieve even better heat-radiating effect. Accordingly, the heat generated by the CPU (A) is conducted through the heat-radiating plate 32 and radiated therefrom to the ambient air. At this time, the hot air in the collection funnel 31 is sucked by the air blower 12 to flow through the bellows 2 and the air exit 11 of the air exhaust box 1 and discharge outside the computer housing. Meanwhile, the cold air in the computer housing will flow through the hollow circular tube 311 of the collection funnel 31 and the central circular hole 323 of the heat-radiating plate 32 to directly blow onto the CPU (A).

Figure 6:
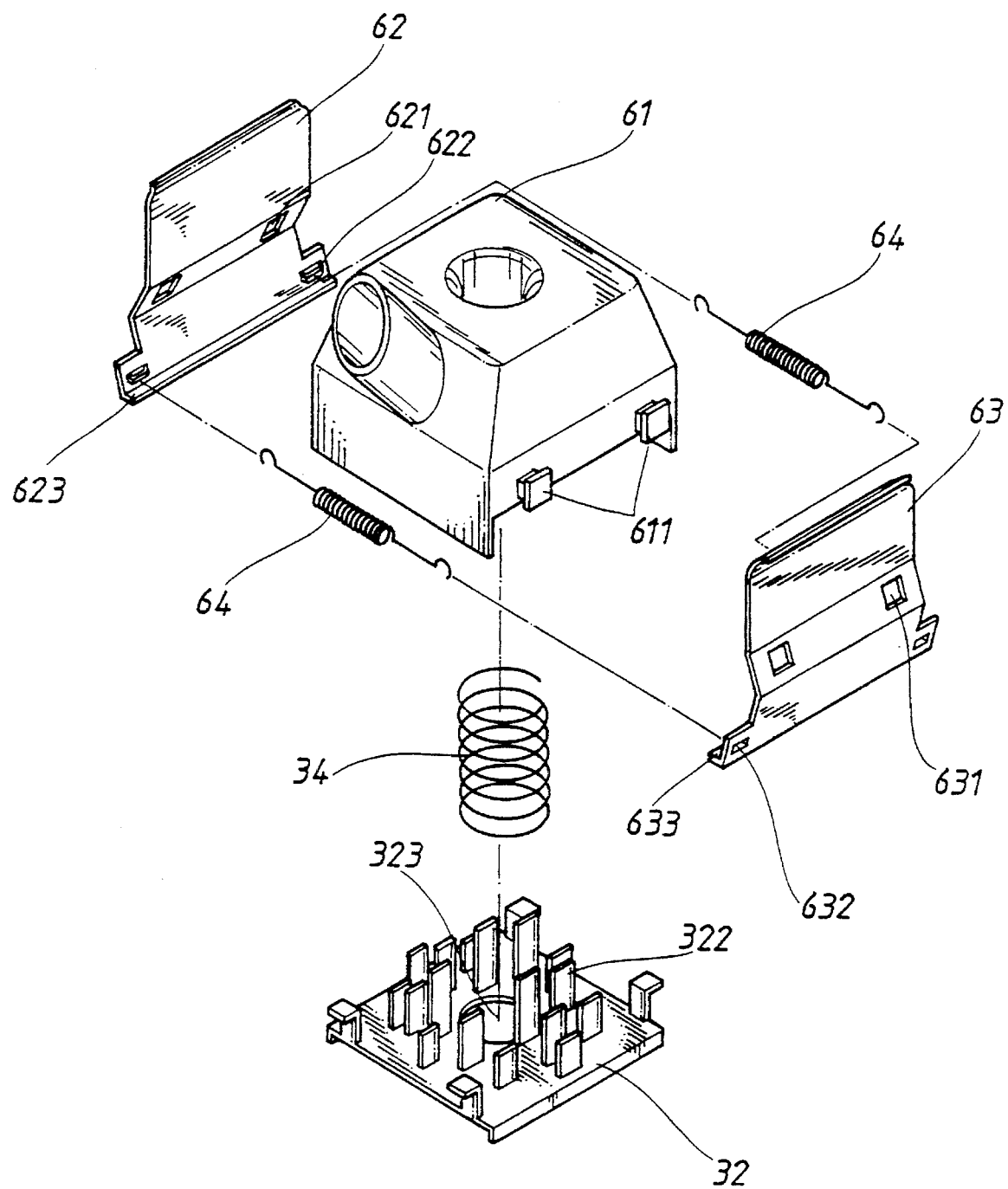
FIG. 6 is a perspective exploded view of a second embodiment of the collection funnel means of the present invention.

FIG. 6 shows another embodiment of the collection funnel means of the present invention, which includes a collection funnel 61, two elastic plates 62, 63, two hooking springs 64, a compression spring 34 and a heat-radiating plate 32. The two elastic plates 62, 63 are disposed on two opposite sides of the collection funnel 61 in such a manner that two pairs of engaging tenons 611 are respectively disposed on the opposite sides of the collection funnel 61 and each elastic plate 62, 63 is formed with two holes 621, 631 for the tenons 611 to fixedly engage therewith. Two ends of each hooking spring 64 are passed through slots 622, 632 formed on bottom ends of the elastic plates 62, 63, making the the hooking spring 64 hooked therebetween. In addition, the elastic plates 62, 63 further respectively have two opposite hooking sections 623, 633 on the bottom ends thereof for hooking/clamping the CPU. When the bottom ends of the two elastic plates 62, 63 are forced to overcome the resilient force of the hooking springs 64 and separate from each other, the CPU can be placed and detachably clamped between the hook sections 623, 633 as shown in FIG. 7. By means of the elastic plates 62, 63, different CPUs with various specifications can be tightly clamped in the collection funnel 61 and the spring 34 presses the heat-radiating plate 32 against the CPU so as to entirely tightly contact therewith for achieving better heat-radiating effect.

It is to be understood that the above description and drawings are only used for illustrating one embodiment of the present invention, not intended to limit the scope thereof. Any variation and derivation from the above description and drawings should be included in the scope of the present invention.

What is claimed is:

1. A heat-radiator for CPU of a computer, comprising an air exhaust box, a collection funnel means and a bellows connecting said air exhaust box with said collection funnel means, said heat-radiator being characterized in that:

said air exhaust box is disposed with an air exit at a first end and an air incoming pipe at a second end, an air blower being disposed at said first end and a circuit interface board being disposed in said air exhaust box to connect with a detector means and said air blower, said circuit interface board being inserted into an interface socket of the computer for power supply; and said collection funnel means includes a collection funnel which has a hollow circular tube downward extending from a top portion of said collection funnel for a first spring to fitted therearound so as to abut against a heat-radiating plate, on two lateral sides of said collection funnel being respectively formed two bosses and slide rails located thereunder, on other two lateral sides of said collection funnel being formed two pairs of latch holes, an air outgoing pipe being disposed on one of said lateral sides for said bellows to fit therewith, two opposite symmetric clamping casings being slidably disposed on said slide rails of said collection funnel, said clamping casings respectively having two tenons on outer sides thereof, whereby a second spring is hooked between the tenons to tightly associate said clamping casings together, said clamping casings further respectively having two opposite hooking sections downward extending from bottom ends thereof for hooking/clamping the CPU, a pushing member being pivotally disposed on said bosses of said collection funnel.

2. A heat-radiator as claimed in claim 1, wherein said pushing member has two elliptic pivot plates at two ends respectively and each pivot plate is formed with a central circular hole for pivotally fitting with said bosses of said collection funnel, two cylindrical projections being disposed on each pivot plate respectively above and below said central circular hole.

3. A heat-radiator as claimed in claim 1, wherein said heat-radiating plate is located on the CPU and disposed with four latch hooks on four corners respectively, multiple elongated column plates being disposed on said heat-radiating plate and a circular hole being formed on a central portion thereof.

4. A heat-radiator as claimed in claim 1, wherein said heat-radiating plate is located on the CPU and disposed with four latch hooks on four corners respectively, multiple elongated column plates being disposed on said heat-radiating plate and a circular hole being formed on a central portion thereof, said latch hooks being up and down movably received in said latch holes of said collection funnel.

5. A heat-radiator as claimed in claim 1, wherein said detector means includes a circuit detector and a temperature detector.

6. A heat-radiator as claimed in claim 1, wherein said detector means includes a circuit detector and a temperature detector and said circuit detector includes a buzzer which emits warning sound when circuit impedance increases.

7. A heat-radiator as claimed in claim 1, wherein said detector means includes a circuit detector and a temperature detector and said temperature detector is able to detect temperature inside the computer and adjust operation speed of said air blower according to the temperature.

8. A heat-radiator as claimed in claim 1, wherein said collection funnel means includes a collection funnel, two elastic plates disposed on two opposite sides of the collection funnel, two hooking springs hooked between the elastic plates, making bottom ends thereof resiliently separable from each other, a compression spring and a heat-radiating plate, wherein the elastic plates are respectively formed with two opposite hooking sections on the bottom ends for fixedly hooking/clamping the CPU, the compression spring and heat-radiating plate being disposed between the collection funnel and the CPU.

9. A heat-radiator as claimed in claim 1, wherein different CPUs with various specifications can be tightly hooked/clamped in the collection funnel means.

10. A heat-radiator as claimed in claim 1, wherein the compression spring and heat-radiating plate are such disposed between the collection funnel and the CPU that the compression spring presses the heat-radiating plate against the CPU so as to entirely tightly contact therewith.

11. A heat-radiator as claimed in claim 1, wherein said collection funnel means includes a collection funnel, two elastic plates disposed on two opposite sides of the collection funnel, two hooking springs hooked between the elastic plates, making bottom ends thereof resiliently separable from each other, a compression spring and a heat-radiating plate, the elastic plates being respectively formed with two opposite hooking sections on the bottom ends for fixedly hooking/clamping the CPU, the compression spring and heat-radiating plate being disposed between the collection funnel and the CPU, whereby different CPUs with various specifications can be tightly hooked/clamped in the collection funnel means.

12. A heat-radiator as claimed in claim 1, wherein the collection funnel means includes a collection funnel, two elastic plates disposed on two opposite sides of the collection funnel, two hooking springs hooked between the elastic plates, making bottom ends thereof resiliently separable from each other, a compression spring and a heat-radiating plate, the elastic plates being respectively formed with two opposite hooking sections on the bottom ends for fixedly hooking/clamping the CPU, the compression spring and heat-radiating plate being disposed between the collection funnel and the CPU with said compression spring disposed between the collection funnel and the heat-radiating plate, whereby the compression spring presses the heat-radiating plate against the CPU so as to entirely tightly contact therewith.

* * * * *